United States Patent [19]

Crozat et al.

[11] Patent Number: 4,976,117
[45] Date of Patent: Dec. 11, 1990

[54] DEVICE AND PROCESS FOR PRODUCING COLD AND/OR HEAT BY SOLID-GAS REACTION

[75] Inventors: Georges Crozat, Perpignan; Michel Lebrun, Elancourt, both of France

[73] Assignees: Faiveley Enterprises, St. Ouen; Societe Nationale Elf Aquitaine, Courbevoie, both of France

[21] Appl. No.: 314,827

[22] PCT Filed: May 20, 1988

[86] PCT No.: PCT/FR88/00256

§ 371 Date: Feb. 27, 1989

§ 102(e) Date: Feb. 27, 1989

[87] PCT Pub. No.: WO88/09466

PCT Pub. Date: Dec. 1, 1988

[30] Foreign Application Priority Data

May 22, 1987 [FR] France ................. 87 07210

[51] Int. Cl.⁵ .............................................. F25B 17/08
[52] U.S. Cl. ................................. 62/480; 165/104.12
[58] Field of Search ..................... 62/480; 165/104.12

[56] References Cited

U.S. PATENT DOCUMENTS

| | | | |
|---|---|---|---|
| 2,469,459 | 2/1950 | Kleen | 62/5 |
| 4,178,987 | 12/1979 | Bowman et al. | 165/104.12 X |
| 4,183,227 | 1/1980 | Bouvin et al. | 62/480 |
| 4,319,626 | 3/1982 | Papazian et al. | 165/1 |
| 4,623,018 | 11/1986 | Takeshita et al. | 62/480 X |
| 4,694,659 | 9/1987 | Shelton | 62/480 X |
| 4,701,199 | 10/1987 | Kabe et al. | 165/104.12 X |

FOREIGN PATENT DOCUMENTS

| | | |
|---|---|---|
| 0196343 | 10/1986 | European Pat. Off. |
| 2846728 | 5/1979 | Fed. Rep. of Germany |
| 683767 | 6/1930 | France |
| 2012954 | 3/1970 | France |
| 2113344 | 6/1972 | France |
| 2377589 | 8/1978 | France |
| 2465970 | 3/1981 | France |
| 2470356 | 5/1981 | France |
| 453347 | 9/1936 | United Kingdom |

Primary Examiner—Lloyd L. King
Attorney, Agent, or Firm—Young & Thompson

[57] ABSTRACT

The device comprises at least two reactors (R1, R2) containing the same solid compound, communication circuits between these reactors, the evaporator (E), the condenser (C) and the gas collector (Co) and means are provided for successively starting the solid-gas reactions in the two reactors and for producing the openings and closings of the various communication circuits in a predetermined order to obtain a continuous production of cold.

12 Claims, 10 Drawing Sheets

EVAPORATION-SYNTHESIS STAGE

DECOMPOSITION – CONDENSATION STAGE

FIG_1
PRIOR ART

FIG_2
PRIOR ART

FIG_2A
PRIOR ART

FIG_3

FIG_7

FIG_10

FIG_11

FIG_15

FIG_16

FIG. 17A

Stage 1 (Decomposition in R2 and synthesis in R1)

Stage 11 (Decomposition in R1 and synthesis in R2)

FIG. 17B

DEVICE AND PROCESS FOR PRODUCING COLD AND/OR HEAT BY SOLID-GAS REACTION

The present invention relates to a device and a process for producing cold and/or heat by solid-gas reaction.

The device and the process to which the invention relates are based on the use of the system known as a "thermochemical pump", whose main characteristics are the following:

thermal energy is employed for operating the system itself; electric energy is optionally employed only for the circulation of the heat-transfer fluids, a reversible reaction between a solid and a gas of the type:

is employed as a "chemical motor".

The reaction is exothermic in the direction (1), which means that in this direction it produces heat, and endothermic in the direction (2), that is to say that in this direction it produces cold.

A system of this kind enables energy to be stored in chemical form and offers varied fields of application.

Moreover, a system of this kind permits, starting with a heat source at the temperature Ts, the production of heat at the temperature Tu such that:

Tu<Ts

In this case, the system is called a "chemical heat pump".

A system of this kind also makes it possible, starting with a heat source at the temperature T's, to produce heat at the temperature T'u such that:

T'u>T's

In this case, the system is called a "chemical heat converter".

By virtue of this system, it is possible to produce refrigeration energy from a heat source and simultaneously to produce, from a heat source at the temperature T"s, heat at the temperature T"u (T"u<T"s) and refrigeration energy.

According to the cases, the use of the heat or of the cold produced is simultaneous with the consumption of energy at high temperature (Ts, T's, T"s) or delayed in time (storage effect).

The principle of the thermochemical pump will be recalled first of all.

For better understanding of the system, the following two cases will be considered in succession:

Production of cold or of heat by using a solid gas reaction (with evaporation+condensation).
Production of cold or of heat by the use of two solid+gas reactions.

The production of cold by the use of a solid+gas reaction

Under given temperature and pressure conditions, certain solids can react with certain gases; this reaction results in the formation of a defined, generally solid, chemical compound, and is accompanied by a release of heat.

When, under other temperature and pressure conditions, heat is introduced into the compound thus formed, a gas release and the formation of the original solid product are observed.

Figure 1:
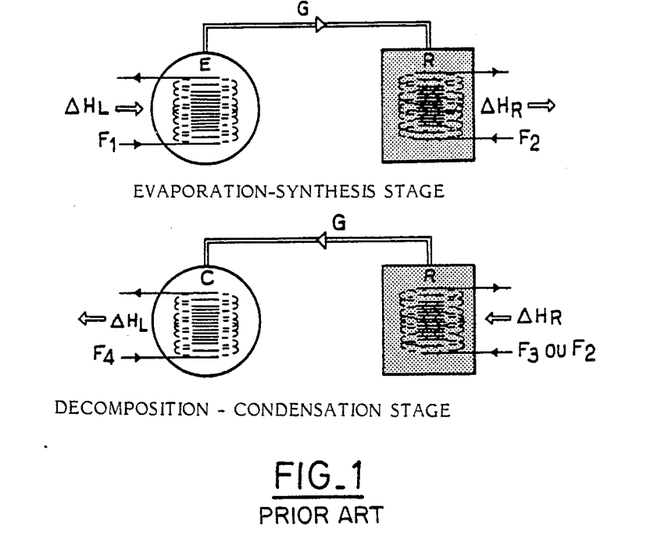
FIG. 1 is a schematic view illustrating the two successive stages of the prior art process for producing cold or heat from a solid-gas system using chemical reaction phenomena.

The operation of the system takes place, therefore, in two stages which are offset in time (see FIG. 1).

In the first stage, called an "evaporation synthesis stage", evaporation of a refrigerant fluid takes place simultaneously with the reaction of the gas thus formed with the solid:

The fluid F1 supplies the heat $\Delta HL$ to the evaporator E.

The compound [G] evaporates and the gas formed is fixed in the reactor A on the solid <S> to give the compound <S,G>.

Within the reactor R the reaction is accompanied by a release of heat $\Delta HR$, the latter being removed by the fluid F2.

The cold source is therefore the evaporator E, the cold being employed directly or indirectly by starting with the fluid F1.

In the case of a process intended to supply heat, the heat $\Delta HR$ is employed.

In the case of a refrigeration machine, the heat $\Delta HL$ is employed.

In the second stage, known as a "decomposition-condensation stage", decomposition of the solid <S,G> takes place simultaneously with the release of gas (G) in the reactor R and condensation of (G) in the condenser C:

The heat $\Delta HR$ is contributed to the solid <S,G> contained in the reactor R by the fluid F3 (or the fluid F2 employed previously).

Under the effect of the heat, the compound (G) is released and condenses in C, the condensation being accompanied by the release of heat $\Delta HL$, the latter being removed by the fluid F4.

In the case of a process intended to supply heat, HL is employed.

The thermodynamic characteristics of this system are the following:

Since a true chemical reaction between a solid and a gas is present, there is a monovariant system at equilibrium, that is to say that an unambiguous relationship exists between the temperature and the pressure, of the form:

$$\log P = A - B/T$$

in which expression P is the pressure, T the temperature (expressed in degrees K), A and B being constants characteristic of the solid/gas pair employed.

Figure 2:
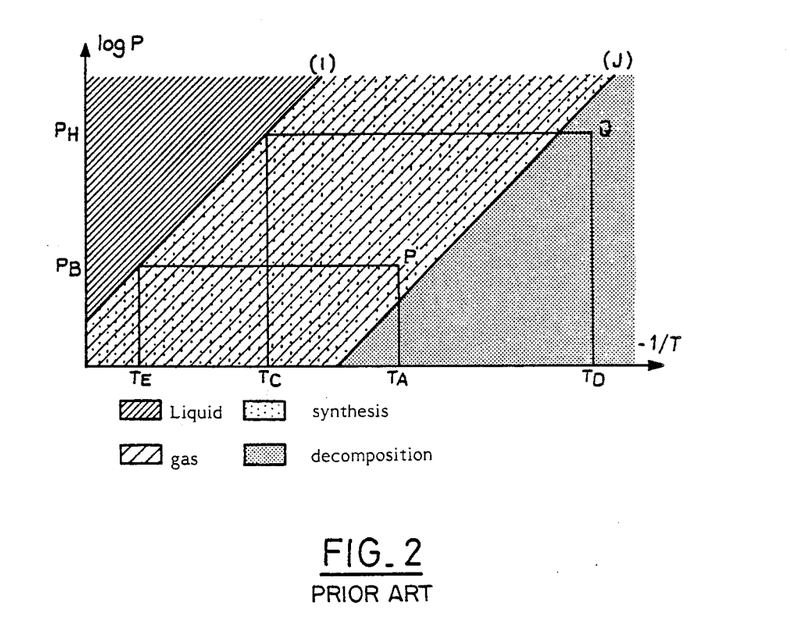
FIG. 2 is a pressure versus temperature diagram illustrating the operation of the prior art system of FIG. 1 for production of cold.

The two stages of operation can thus be represented in a pressure (P)/temperature (T) diagram (see FIG. 2).

In this figure:

(I) is the equilibrium straight line (G)⇌[G] and (J) is the equilibrium straight line $<S>+(G) \rightleftarrows <S,G>$ The equilibrium straight line (I) determines two regions in which either condensation or evaporation of G takes place.

The equilibrium straight line (J) determines two regions in which there is either synthesis of the compound $<S,G>$ from $<S>$ and from (G), or decomposition of the solid $<S,G>$ with release of (G).

During the evaporation-synthesis stage, [G] evaporates at the temperature TE and reacts with the solid $<S>$, which is at the temperature TA.

This temperature TA is such that the operating point of the solid (point P) is in a synthesis region.

This stage is carried out at the pressure PB.

During the decomposition-condensation stage, the compound $<S,G>$ is at the temperature TD such that the operating point of the solid (point Q) is in a decomposition region.

The released gas (G) will condense at the temperature TC.

This stage is carried out at the pressure HP, such that PH>PB.

Production of heat by using two solid-gas reactions

This system is closely related to the preceding one, but instead of performing the condensation and the evaporation of G, it is reacted with a second solid:

Consequently, the following reactions take place successively:

Stage I:

Stage II.

Figure 2A:
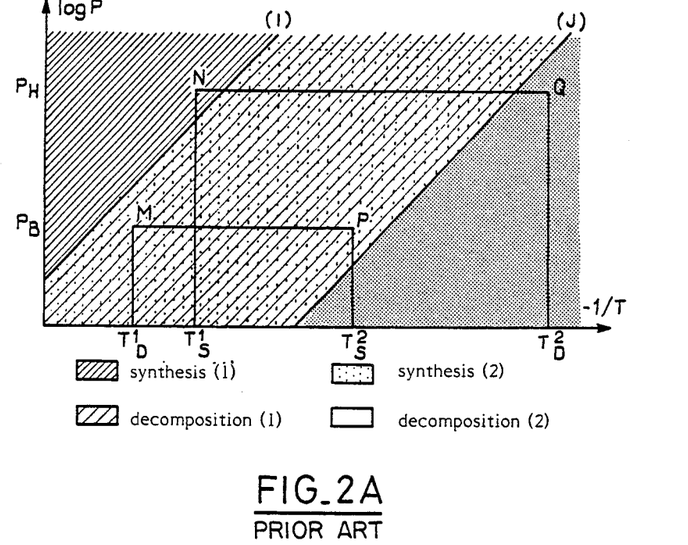
FIG. 2A is a diagram similar to that of FIG. 2, illustrating the oepration of the prior art system of FIG. 1 using two solid-gas reactions for production of heat.

As previously, the operation of the system can be represented on a pressure/temperature diagram (see FIG. 2A).

In this figure:

(I) is the equilibrium straight line $<S1>+(G) --- <S1,G>$ (J) is the equilibrium straight line $<S2>+(G) --- <S2,G>$ The fluid G is always in the gaseous state and circulates alternately between two reactors, one of which contains the solid $<S1>$ (or $<S1, G>$) and the other solid $<S2>$ (or $<S2,G>$).

If this system is employed as a heat pump, the energy balance is established as follows:

contribution of ΔH2 to TD2
use of ΔH1 at T1S and of ΔH2 at T2S
"pumping" of ΔH1 (gratis energy) at TD1.

The known equipment for producing cold according to the principle described in paragraph A above comprises only a single reactor associated with an evaporator, a condenser and a cold-collector. This equipment does not allow cold to be produced continuously.

Similarly, known equipment for producing heat according to the principle described in paragraph B above comprises only a single reactor associated with another reactor and does not allow heat to be produced continuously.

The aim of the present invention is to contribute improvements to the known equipment employing the abovementioned systems and principles.

According to a first feature, the invention relates to a device for producing cold, comprising two reactors which contain a solid compound capable of reacting with a gas according to an exothermic reaction, these reactors being connected to a condenser, a gas collector and an evaporator, the interior of the reactors being in a heat exchange relationship with a heat source, means being provided for successively starting the solid-gas reactions in the two reactors and for producing the openings and closings of the various communication circuits between the reactors, the condenser, the collector and the condenser, in a predetermined order in order to obtain a continuous production of cold.

The invention also relates to a device for producing heat, comprising two pairs of reactors, each containing a solid compound capable of reacting with the gas, communication circuits between the various reactors and means for successively starting the solid-gas reactions in the reactors, and for producing the openings and the closings of the various communication circuits in a predetermined order to obtain a continuous production of heat.

According to the invention, this device comprises means for starting the defrosting, these means being adapted to produce the following operations:

closing of the circuit between the two reactors,
opening of the circuit between the evaporator and the condenser and opening of the circuit between the evaporator and the gas collector.

The invention also relates to a device allowing cold or heat to be produced at will and comprises means which enable two reactors to cooperate, either with the evaporator and the condenser or with the other two reactors.

According to a preferred version of the invention, the device for producing cold comprises means for producing the following successive steps:

(A) opening of the circuit between one of the reactors and the evaporator and between the latter and the gas collector, (B) opening of the circuit between the evaporator and the first reactor as soon as the gas pressure in the evaporator is higher than that in the first reactor, (C) opening of the circuit between the other reactor and the evaporator and between the latter and the gas collector, (D) opening of the circuit between the evaporator and the second reactor as soon as the gas pressure in the evaporator is higher than that in the second reactor, (E) opening of the circuit between the first reactor and the external heat source to heat the solid contained in this reactor, (F) opening of the circuit between the first reactor and the condenser as soon as the pressure in the reactor is higher than that in the condensor, (G) closing of the circuit between the first reactor and the heat source and opening of the circuit between the second reactor and the heat source, (H) closing, under the effect of the pressure prevailing in the second reactor, of the circuit included between the latter and the evaporator and opening of the circuit between the second reactor and the condenser, (I) closing, after a pressure drop in the first reactor, of the circuit between the latter and the condenser and opening of the circuit between this reactor and the evaporator.

According to an advantageous version of the invention the device comprises a third reactor containing the said solid compound capable of reacting with the gas, and connected to the external heat source, the condenser, the collector and the evaporator, means being provided for successively starting the solid-gas reactions in the three reactors so that the third reactor can store energy without an energy input other than that needed for the circulation of the heat-transfer fluid.

Other special features and advantages of the invention will also become apparent from the description below.

In the attached drawings, which are given by way of examples without any limitation being implied:

FIG. 16 shows the fourth step of the operation of the device according to FIG. 12, FIGS. 17A and 17B are diagrams illustrating jointly the two successive stages of a process for producing heat with the device of the present invention, FIG. 17A illustrating stage I (Decomposition in R2 and Synthesis in R1) and FIG. 17B illustrating stage II (Decomposition in R1 and Synthesis in R2), taking place respectively and successively in each one of the two pairs of reactors R1, R2.

Figure 3:
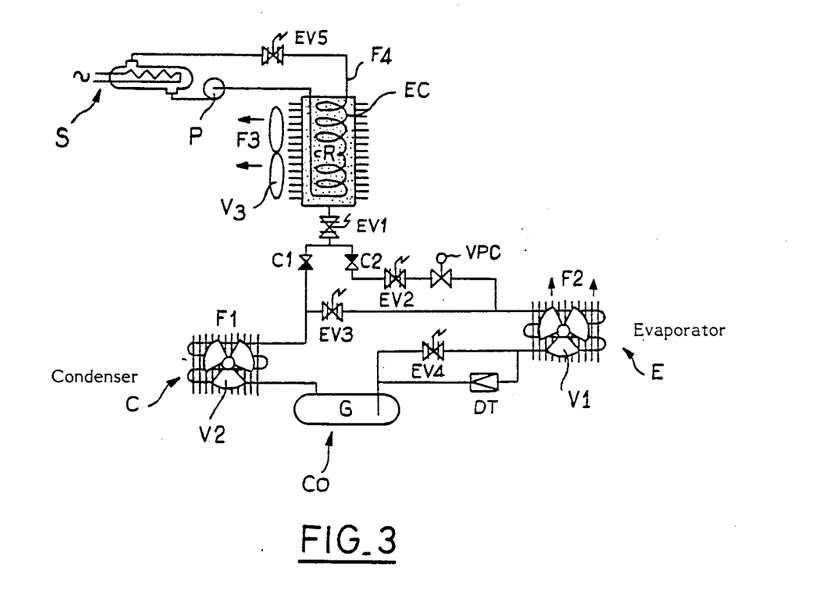
FIG. 3 is the diagram of a device for producing cold, with a single reactor.

Shown in the embodiment of FIG. 3 is a device for producing cold noncontinuously from the physicochemical phenomenon in which manganese chloride and ammonia are reacted, as indicated below:

$$<MnCl_2, 2NH_3> + 4(NH_3) \rightarrow <MnCl_2, 6NH_3>$$

This device comprises:

a reactor R containing the solid reaction medium $<MnCl_2, 2NH_3>$, which is connected to a condensor C, a collector Co form liquified gas, G, included between the latter and an evaporator E.

This device comprises, furthermore, a nonreturn valve C1 in the circuit connecting the reactor R to the condenser C, a nonreturn valve C2 in the circuit connecting the evaporator E to the reactor R, a thermostatic expansion valve DT in the circuit connecting the reactor R to the evaporator E, a controlled pressure valve VPC, a solenoid valve EV1 isolating the reactor R from the rest of the circuit, a solenoid valve EV2 isolating the evaporator E from the reactor R, two solenoid valves EV3 and EV4 for defrosting and a solenoid valve EV5 permitting a heat transfer fluid F4 to be distributed into the exchanger EC contained in the reactor E and connected to an external heat source S by means of a pump P.

Figure 4:
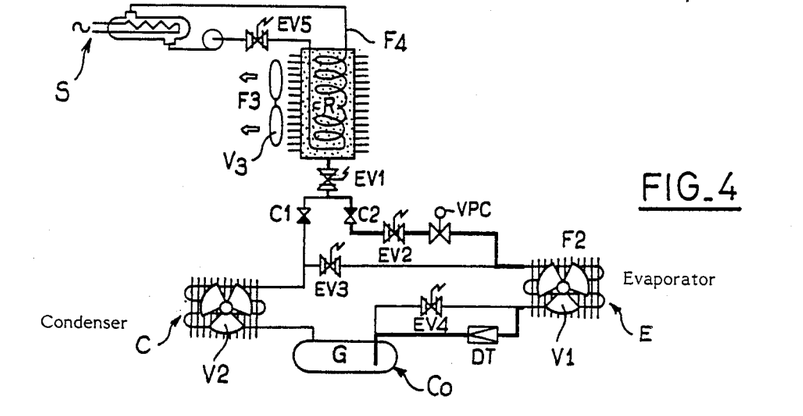
FIG. 4 is a diagram similar to FIG. 3, showing the first step of the operation of the device according to FIG. 3.
Figure 5:
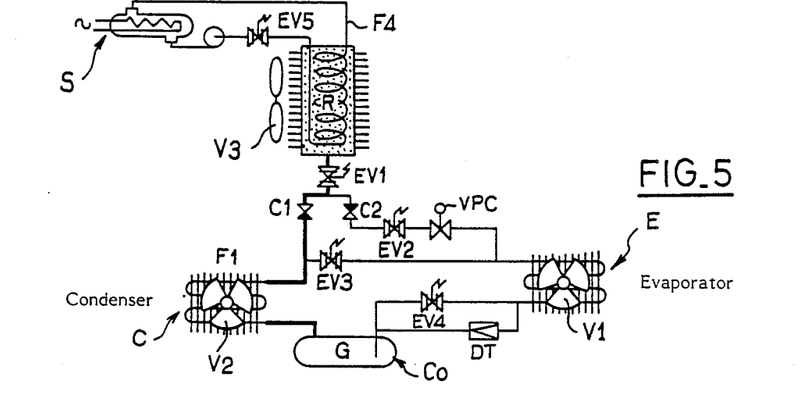
FIG. 5 shows the second step of the operation of the device according to FIG. 3.
Figure 6:
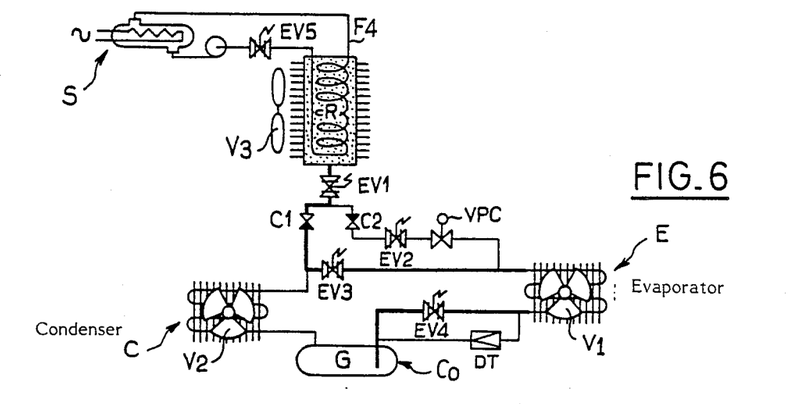
FIG. 6 shows the third step of the operation of the device according to FIG. 3.

The various operating steps of the device are illustrated by FIGS. 4 to 6 and by the table below:

TABLE 1

| Steps | Stop 0 | Start-ups 0 | Cycle 1 | Cycle 2 | Defrosting 3 |
|---|---|---|---|---|---|
| EV1 | C | O | O | O | O |
| EV2 | C | O | O | O | C |
| EV3 | C | C | C | C | O |
| EV4 | C | C | C | C | O |
| EV5 | C | C | C | O | O |
| C1 | C | C | C | O | O |
| C2 | C | C | O | C | C |

*O = open; C = closed

Initial State: Step 0

The reactor R has a maximum cold potential, that is to say that the solid within consists of salt $<S>$ capable of reacting with the gas (G).

All the solenoid valves are closed and the collector Co is filled with refrigerant fluid [G]. To start up, the solenoid valve EV1 is opened.

Step 1 (FIG. 4)

The solenoid valve EV2 opens, the fluid [G] travels from the collector Co towards the evaporator E. In the latter, it vaporizes, the heat being given up by the fluid F2, for example air, which is employed for conveying the cold produced. The fluid F2 transmits the negative calories to the enclosure to be cooled. In the example shown, air is blown into this enclosure by means of a fan V1.

The thermostatic expansion valve (VPC) controls the pressure in the evaporator E and consequently the temperature of the liquid [G] boiling in the evaporator E. When the pressure in the evaporator E is higher than the pressure in the reactor R, the valve C2 opens and the gas (G) reacts with the solid $<S>$ in the reactor R, the heat of reaction being removed by means of an exchanger where F3 circulates. The fluid F3 is air propelled by a motor-driven fan V3 which removes the heat of exothermic reaction to the outside.

Step 2 (FIG. 5)

When the synthesis reaction has ended in the reactor R, the valve EV5 opens, the solid <S,G> present in the reactor R is heated by the fluid F4 which is, for example, a thermal oil. When the pressure in the reactor R is higher than that prevailing in the condenser C, or in the collector Co, the valve C1 opens, the valve C2 having closed as soon as the pressure in the reactor R was higher than that prevailing in the evaporator E.

The gas originating from the reactor R condenses in the condenser C and then flows into the collector Co, the heat of condensation being removed by the fluid F1, the fluid F1 being air, as in a traditional compression plant, blown in by means of a fan V2.

During this step 2, no cold production takes place, since the fluid [G] cannot circulate in the evaporator. The cold production is therefore noncontinuous.

Step 3 (FIG. 6)

When intervening in the cycle, this step corresponds to defrosting. The latter takes place within the evaporator E itself, employing it as a condenser.

The start-up of the defrosting operation must take place at step 2, that is to say during the operation of decomposition of the solid in the reactor R.

For this operation, the valve EV2 closes and the valve EV3 opens simultaneously.

The gas (G) originating from the decomposition reaction in the reactor R condenses preferentially in the evaporator E and thus produces the defrosting. The valve EV4 being open, the condensed fluid [G] flows into the collector Co.

Step 4

In this step, step 1 is regained, that is to say the production of cold by the evaporator E.

The devices for producing cold which will now be described make it possible to produce cold continuously, which makes them particularly suited to industrial needs, especially in transport vehicles.

Figure 7:
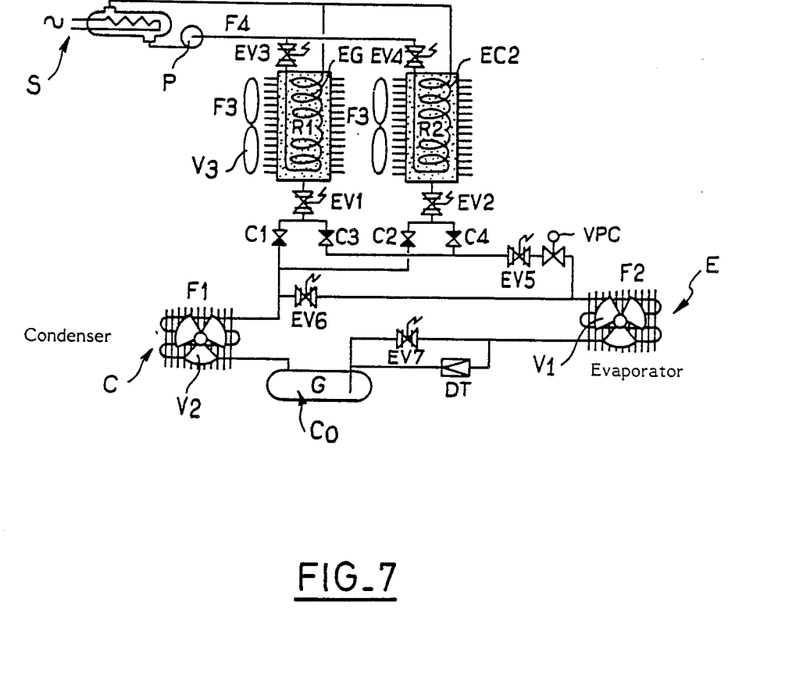
FIG. 7 is the diagram of a device for producing cold, with two reactors.

The device shown in FIG. 7 comprises mainly:
two identical reactors (R1 and R2) containing the solid reaction medium,
a condenser C,
a collector Co for liquefied gas G,
an evaporator E,
two nonreturn valves (C1 and C2) in the circuits connecting the reactors R1 and R2 to the condenser C,
two nonreturn valves (C3 and C4) in the circuits connecting the evaporator E to the reactors R1 and R2,
a thermostatic expansion valve (DT) between the evaporator E and the collector Co,
a controlled pressure valve (VPC) between the reactors R1, R2 and the evaporator E,
two solenoid valves (EV1 and EV2) isolating the reactors R1 and R2 from the rest of the circuit,
a solenoid valve (EV5) isolating the evaporator E from the reactors R1 and R2,
two solenoid valves (EV6 and EV7) for the defrosting,
two solenoid valves (EV3 and EV4) permitting a fluid F4 to be distributed into the exchangers EC1 and EC2 contained in the reactors R1 and R2.

The various operating steps of this device are illustrated by FIGS. 8 to 11 and by the table 2 below.

TABLE 2

| Steps | Start-up 0 | 1 | Cycle 2 | 3 | Defrosting* 4 | 5 | Recharge 6 |
|---|---|---|---|---|---|---|---|
| EV1 | C | O | O | O | O | O | O |
| EV2 | C | C | O | O | O | O | O |
| EV3 | C | C | O | C | C | C | O |
| EV4 | C | C | C | O | O | O | O |
| EV5 | C | O | O | O | C | O | O |
| EV6 | C | C | C | C | O | C | C |
| EV7 | C | C | C | C | O | C | C |
| F3 to | — | R1 | R2 | R1 | R1 | R1 | |
| C1 | C | C | O | C | C | C | O |
| C2 | C | C | C | O | O | O | O |
| C3 | C | O | C | O | C | O | C |
| C4 | C | C | O | C | C | C | C |

*case where the defrosting takes place during step 3

Initial State: Step 0

The reactors R1 and R2 have a maximum cold potential, that is to say that the solids within consist of salt <S> capable of reacting with the gas (G). All the solenoid valves are closed and the collector Co is filled with refrigerant fluid.

Figure 8:
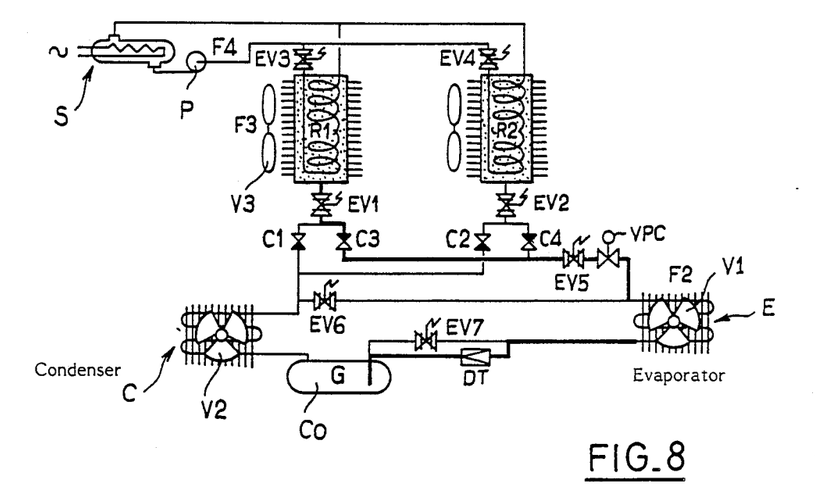
FIG. 8 shows the first step of the operation of the device according to FIG. 7.

Step 1: (FIG. 8)

The solenoid valves EV1 and EV5 open. The fluid G travels from the collector Co towards the evaporator E. In the latter, it vaporizes, the heat being given up by the fluid F2 which is therefore employed for producing the cold.

When the fluid F2 is air, it transmits the negative calories to the enclosure to be cooled.

The thermostatic expansion valve (DT) prevents the fluid G from circulating beyond the evaporator E in the liquid state. The valve VPC controls the evaporation pressure level and hence the evaporation temperature. When the pressure in the evaporator E is higher than the pressure in the reactor R1, the valve C3 opens and the gas (G) reacts with the solid <S> in R1, the heat of reaction being removed oy means of an exchanger where F3 circulates. The fluid F3 is air propelled by a motor-driven fan V3 which removes the heat of exothermic reaction towards the outside.

Figure 9:
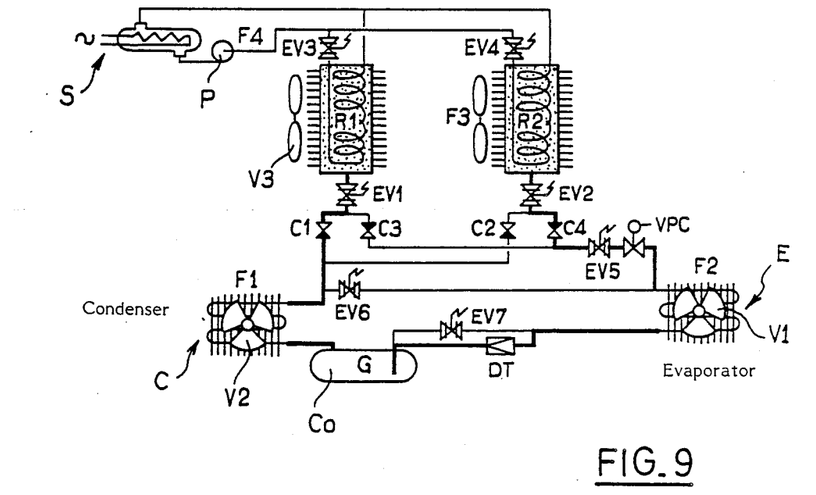
FIG. 9 shows the second step of the operation of the device according to FIG. 7.

Step 2: (FIG. 9)

When the synthesis reaction has ended in the reactor R1, the valve EV2 opens. When the pressure in the evaporator E is higher than the pressure prevailing in the reactor R2, the valve C4 opens and the fluid G evaporates in the evaporator E and reacts with the solid <S> present in the reactor R2.

The heat of evaporation is contributed to the evaporator E by the fluid F2 and the heat of reaction released in R2 is removed by the fluid F3.

The opening of the valve EV3 takes place simultaneously with the opening of the valve EV2. The solid <S,G> present in the reactor R1 is heated by the fluid F4. When the pressure in the reactor R1 is higher than that prevailing in the condenser C (or in the collector Co), the valve C1 opens, the valve C3 having closed as soon as the pressure in R1 was higher than that prevailing in the evaporator E.

The gas (G) originating from the reactors R1 condenses in the condenser Co, the heat of condensation being removed by the fluid F1, and flows into the collector Co.

Figure 10:
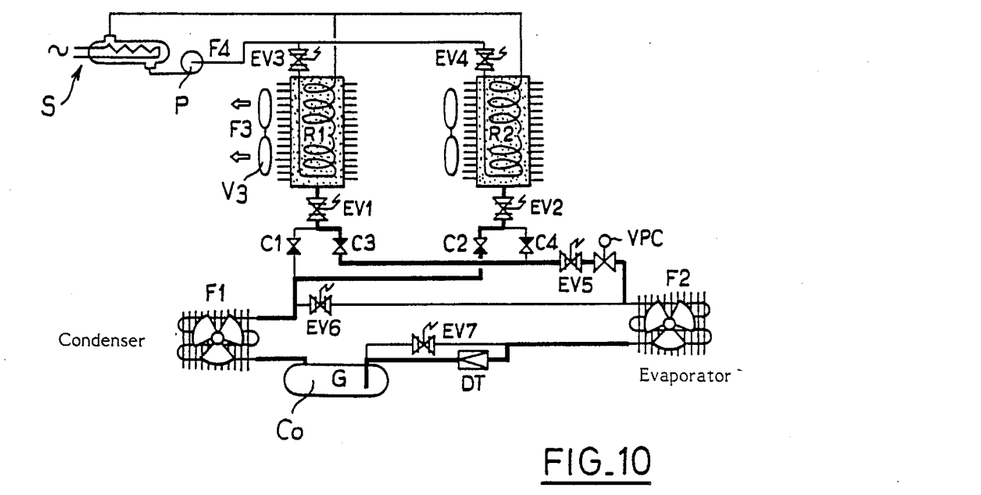
FIG. 10 shows the third step of the operation of the device according to FIG. 7.

Step 3: (FIG. 10)

When the reactions in the reactors R1 and R2 have ended, the valve EV3 closes and the valve EV4 opens. The solid <S,G> present in R2 is heated by the fluid F4. The pressure in R2 rises and, successively, the valve C4 closes and the valve C2 opens. The gas (G) originating from R2 condenses in E, the heat of condensation being removed by the fluid F1, and flows into the collector Co.

The fluid F3 circulates in the exchanger E of the reactor R1. When the latter cools, the pressure drops and the valve C1 closes and the valve C3 opens successively. The fluid (G) evaporates in E and reacts in the reactor R1 with the solid <S>. The heat of evaporation is, as previously, contributed by the fluid F2 (air), which cools and is therefore employed for distributing the cold in the enclosure to be cooled.

Figure 11:
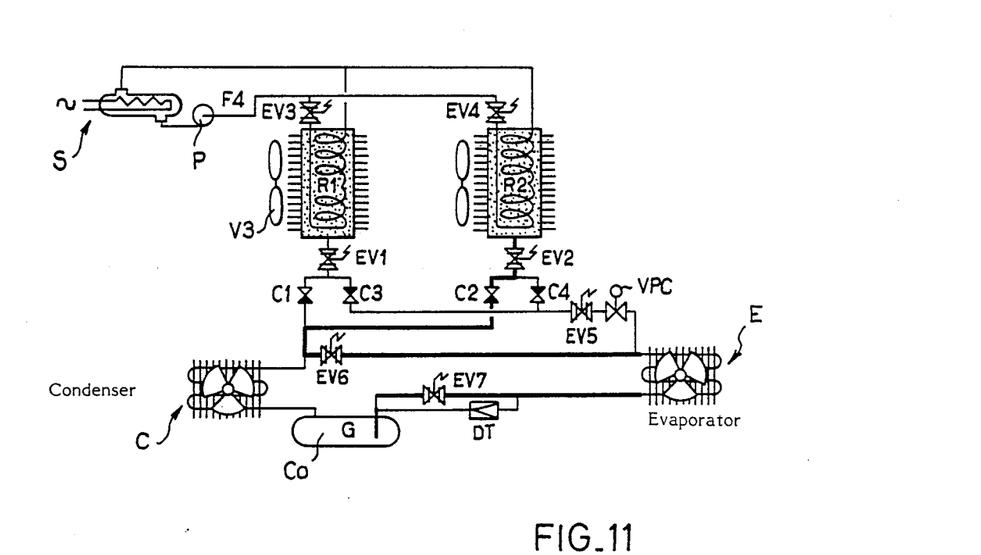
FIG. 11 shows the fourth step of the device according to FIG. 7.

Step 4: (FIG. 11)

This step, which can form part of step 2 or 3, relates to the defrosting operation. The latter takes place within the evaporator E itself, using it as a condenser.

When the defrosting starts, the valve EV5 closes and the valve EV6 opens.

The gas (G) originating from the decomposition reaction condenses preferentially in the evaporator E.

The heat of condensation released produces the defrosting. Since the valve EV7 is open, the condensed fluid G flows into the collector Co.

Step 5

This step corresponds to a return to the normal cycle after the defrosting operation. The valves EV6 and EV7 close and EV5 opens.

The gas (G) flows from the reactor R1 which is heated by the fluid F4 towards the condenser C and the collector Co.

The gas (G) evaporates in E and reacts with the solid <S> in the reactor cooled by the fluid F3. As described in Step 2 or 3, the cycle recommences normally by alternation of the steps 2 or 3.

Step 6

This step does not correspond to the normal operating cycle but it makes it possible to restore the machine to its full refrigerating potential (step 0).

During this step, no cold is produced and the two reactors R1 and R2 are returned to their maximum cold potential.

The valves EV3 and EV4 are open.

The solid <S,G> present in the reactors R1 and R2 is heated by the fluid F4.

The gas (G) produced during the decomposition of <S,G> condenses in C and flows into the collector Co. The operation is ended when only the solid <S> is left in each of the reactors R1 and R2. The valves EV1 to EV5 are then closed, the valves C1 and C2 closing as a result of the pressure drop in R1 and R2, the latter being a consequence of the heating of the reactors being stopped.

When employing the solid-gas reactions just described, the above device not only permits a continuous production of cold, but also makes it possible to obtain temperatures of between −40° C. and +10° C. which are optimum for the low-temperature transport of foodstuffs or other products.

Figure 12:
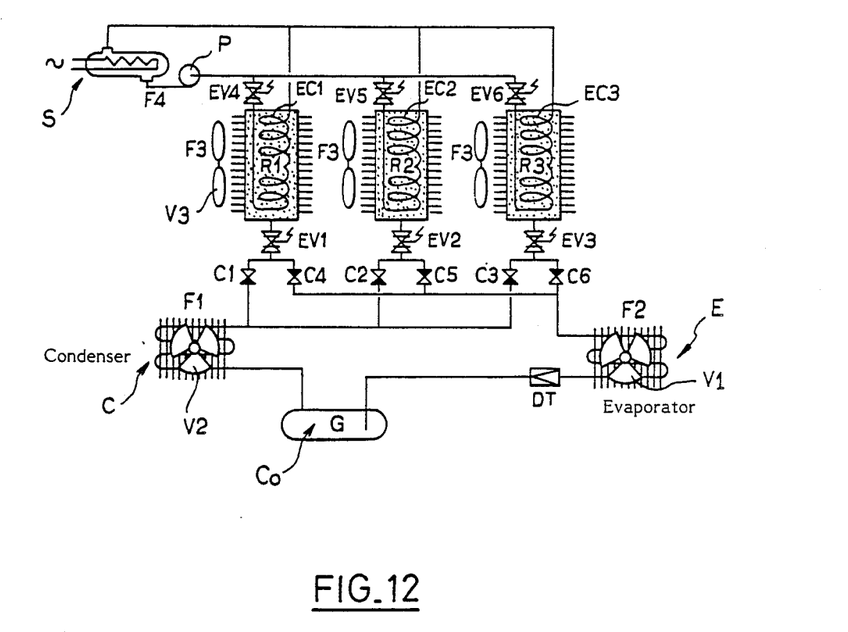
FIG. 12 is the diagram of a device for producing cold, with three reactors.

FIG. 12 shows a device for producing cold which makes it possible, by starting with a noncontinuous physicochemical phenomenon, to ensure a continuous production of cold and a storage of refrigeration energy.

This device comprises mainly:
- three identical reactors (R1, R2, R3) containing the solid reaction medium,
- a condenser C,
- a collector Co for liquefied gas G,
- an evaporator E,
- three nonreturn valves (C1, C2, C3) in the circuit connecting the reactors R1, R2, R3 to the condenser C,
- three nonreturn valves (C4, C5, C6) connecting the evaporator E to the reactors R1, R2, R3,
- a thermostatic expansion valve (DT) between the evaporator E and the collector Co,
- three solenoid valves (EV1, EV2, EV3) isolating the reactors R1, R2 and R3 from the rest of the circuit,
- three solenoid valves (EV4, EV5, EV6) permitting a fluid F4 to be distributed into exchangers (EC1, EC2, EC3) contained in the reactors R1, R2, R3.

Figure 13:
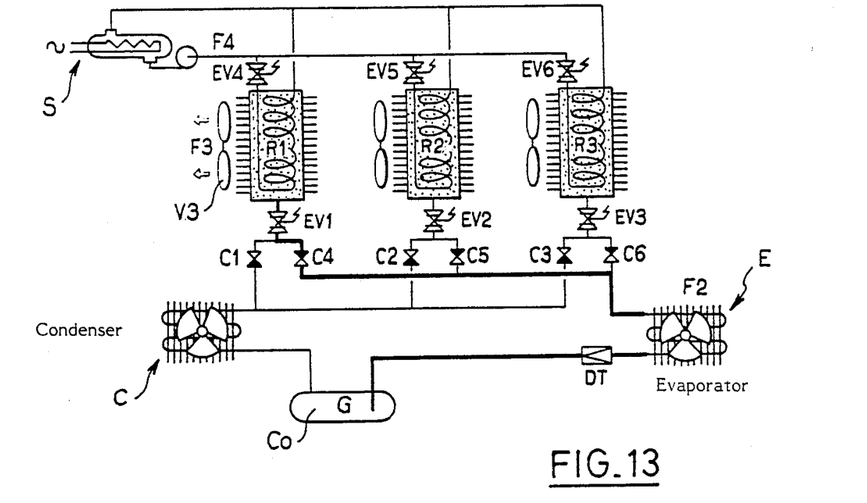
FIG. 13 shows the first step of the operation of the device according to FIG. 12.
Figure 14:
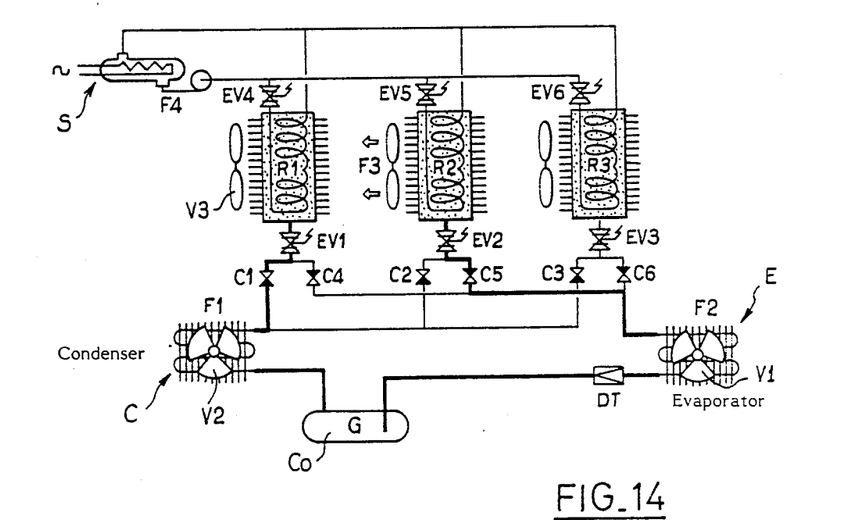
FIG. 14 shows the second step of the operation of the device according to FIG. 12.
Figure 15:
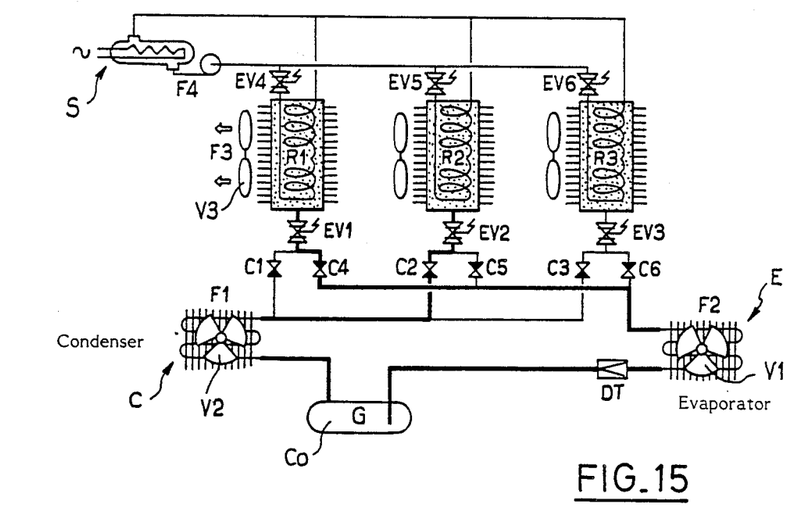
FIG. 15 shows the third step of the operation of the device according to FIG. 12.
Figure 16:
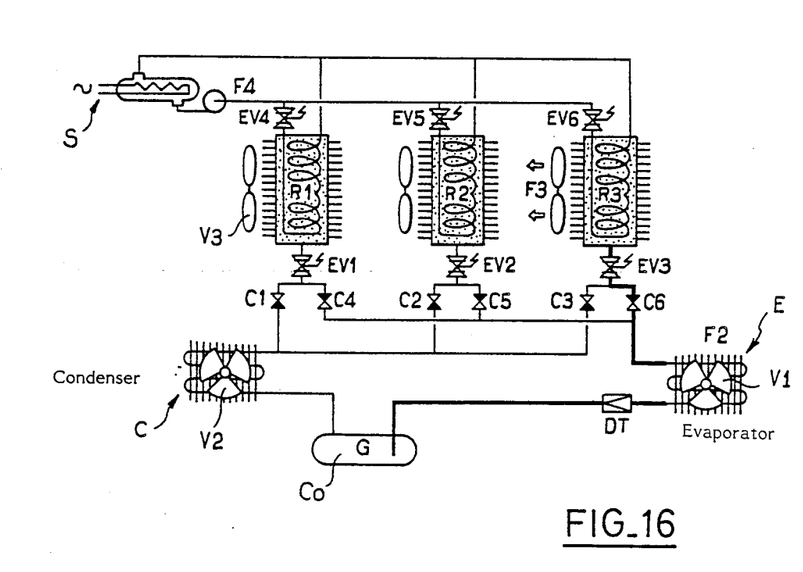

The various operating steps of this device are shown in FIGS. 13 and 16 and in the table below.

TABLE 3

| STEPS | Cycle | | | | | | |
|---|---|---|---|---|---|---|---|
| | 0 | 1 | 2 | 3 | 4 | 5 | 6 |
| EV1 | C | O | O | O | C | O | O |
| EV2 | C | C | O | O | C | O | O |
| EV3 | C | C | C | C | O | C | O |
| EV4 | C | C | O | C | C | C | O |
| EV5 | C | C | C | O | C | O | O |
| EV6 | C | C | C | C | C | C | O |
| F3 to | — | R1 | R2 | R1 | R3 | R1 | — |
| C1 | C | C | O | C | C | C | O |
| C2 | C | C | C | O | C | O | O |
| C3 | C | C | C | C | C | C | O |
| C4 | C | O | C | O | C | O | C |
| C5 | C | C | O | C | C | C | C |
| C6 | C | C | C | C | O | C | C |

Step 0: Initial State

The reactors R1, R2 and R3 have a maximum cold potential, that is to say that the solids within consist of the salt <S> capable of reacting with the gas (G). All the solenoid valves are closed and the collector Co is filled with refrigerant fluid [G].

Step 1: Start-up (FIG. 13)

The solenoid valve EV1 opens. The fluid [G] travels from the collector Co towards the evaporator E. It vaporizes in the latter, the heat being given up by the fluid F2 which is employed for distributing the cold. The thermostatic expansion valve (DT) prevents the fluid [G] from circulating beyond the evaporator E in the liquid state. When the pressure in the evaporator is higher than the pressure in R1, the valve C4 opens and the gas [G] reacts with the solid <S> in the reactor R1, the heat of reaction being removed by means of an exchanger where F3 circulates.

Step 2: Cycle (stage 1) (FIG. 14)

When the synthesis reaction has ended in the reactor R1, the valve EV2 opens. When the pressure in the evaporator E is higher than the pressure prevailing in the reactor R2, the valve C5 opens and the fluid [G] which evaporates in E reacts with the solid <S> present in the reactor R2.

The heat of evaporation is contributed to the evaporator E by the fluid F2 and the heat of reaction released in R2 is removed by the fluid F3.

Opening of the valve EV4 takes place simultaneously with the opening of the valve EV2; the solid $<S,G>$ present in the reactor R1 is heated by the fluid F4. When the pressure in R1 is higher than that prevailing in the condenser C (or in the collector), the valve C1 opens, the valve C4 having closed as soon as the pressure in R1 was higher than that prevailing in the evaporator E. The gas (G) originating from R1 is condensed in the condenser C by the fluid F1 and flows into the collector Co.

Step 3: Cycle (stage 2) (FIG. 15)

When the reactions in the reactors R1 and R2 have ended, the valve EV4 closes and the valve EV5 opens. The solid $<S,G>$ present in R2 is heated by the fluid F4. The pressure in R2 rises and the valve C5 closes and the valve C2 opens, successively. The gas (G) originating from R2 condenses in the condenser C, the heat of condensation being removed by the fluid F1, and flows into the collector Co. The fluid F3 circulates in the exchanger in the evaporator E of the reactor R1. As the latter cools, the pressure drops and the valve C1 closes and the valve C4 opens, successively. The fluid (G) evaporated in the evaporator E reacts with the solid $<S>$ in the reactor R1. As previously, the heat of evaporation is contributed by the fluid F2, which cools and is therefore employed for producing cold.

Alternation of the stages 1 and 2 forms the normal operating cycle of the system.

Step 4: Operation on Storage (FIG. 16)

The fluid F4 is not heated and no longer circulates in the reactor R2. The circulation of (G) from R2 towards the condenser C is stopped by the closing of the valve EV2.

Thd fluid F3 no longer circulates in the reactor R1, the circulation of (G) from the evaporator towards the reactor R1 is stopped by the closing of the valve EV1.

The solenoid valve EV3 is open and the fluid F3 circulates in an exchanger EC3 situated in the reactor R3. When the pressure in the evaporator E is higher than the pressure prevailing in R3, the valve C6 opens and the fluid (G) evaporated in E reacts with the solid $<S>$ in R3; the heat of the reaction is removed by F3 and the cold is conveyed by the fluid F2 cooled in the evaporator E.

Step 5: Restart of the Cycle (stage 2)

When the operation on storage has stopped, the normal cycle recommences at step 3 (cycle: stage 2). The valve EV3 is closed and the valves EV1 and EV2 are reopened. The fluid F4 is heated and circulates again in the reactor R2. The operation is then identical with that described in step 3.

Step 6: Recharge

This step corresponds to stopping the cycle and restoring the whole system to the initial state.

The valves EV1, EV2 and EV3 are open. Since the valves EV4, EV5 and EV6 are open, the fluid F4 circulates in the three reactors R1, R2 and R3. The solids inside the latter are heated; when the pressure in R1, R2 and R3 is higher than the pressure prevailing in the condenser, the valves C1, C2 and C3 open and the gas (G) originating from the decompositions of $<S,G>$ condenses in the condenser and flows towards the collector Co. The heat of condensation is removed by the fluid F1.

This operation is conducted until the reactors contain only the solid $<S>$, that is to say until the step 0 (initial state) has been regained.

As described with reference to the device with two reactors, the techniques employed for controlling the temperatures (VPC) and for the defrosting may be applied to this device with three reactors.

From the above description it follows that the third reactor R3 makes it possible to store energy without any energy input other than that needed for the circulation of the heat-transfer fluid F4.

The devices which have just been described, producing cold continuously, make it possible to produce cold down to −40° C. in the enclosure to be refrigerated, provided that the maximum temperature outside the latter does not exceed 30° C., the distance of the point Q (FIG. 2) relative to the equilibrium straight line J being 20° C. and the condensation temperature being 35° C.

To this end, it is necessary:
(a) to produce the following simultaneous reactions inside the reactor R:

$n[NH_3] \rightarrow n(NH_3)$ then $n(NH_3) \rightarrow n[NH_3]$

X being chosen from $ZnCl_2$, $CuSO_4$, $CuCl$, $LiBr$, $LiCl$, $ZnSO_4$, $SrCl_2$, $MnCl_2$, $FeCl_2$, $MgCl_2$, $CaCl_2$ and $NiCl_2$, m and n being numbers such that:

| | |
|---|---|
| m = 3, n = 1 | when X = $ZnSO_4$ |
| m = 4, n = 1 | when X = $CuSO_4$ |
| m = 0, n = 1 | when X = $LiCl$, $SrCl_2$ |
| m = 1, n = 1 | when X = $LiCl$, $CaCl_2$ |
| m = 2, n = 2 | when X = $ZnCl_2$, $CuSO_4$ |
| m = 1, n = 0.5 | when X = $CuCl$ |
| m = 2, n = 1 | when X = $LiBr$, $ZnSO_4$ |
| m = 2, n = 4 | when X = $MnCl_2$, $FeCl_2$, $NiCl_2$ |
| m = 4, n = 2 | when X = $MgCl_2$ |

(2) that the external heat source S is at a temperature $T_h$ higher than a value such that:

| | |
|---|---|
| when X = $ZnCl_2$ (m = 2, n = 2) | $T_h$ = 139° C. |
| when X = $CuSO_4$ (m = 4, n = 1) | $T_h$ = 145° C. |
| when X = $CuCl$ (m = 1, n = 0.5) | $T_h$ = 151° C. |
| when X = $LiBr$ (m = 2, n = 1) | $T_h$ = 155° C. |
| when X = $LiCl$ (m = 1, n = 1) | $T_h$ = 167° C. |
| when X = $ZnSO_4$ (m = 3, n = 1) | $T_h$ = 173° C. |
| when X = $SrCl_2$ (m = 0, n = 1) | $T_h$ = 173° C. |
| when X = $MnCl_2$ (m = 2, n = 4) | $T_h$ = 174° C. |
| when X = $LiCl$ (m = 0, n = 1) | $T_h$ = 203° C. |
| when X = $FeCl_2$ (m = 2, n = 4) | $T_h$ = 208° C. |
| when X = $MgCl_2$ (m = 4, n = 2) | $T_h$ = 217° C. |
| when X = $CuSO_4$ (m = 2, n = 2) | $T_h$ = 230° C. |
| when X = $ZnSO_4$ (m = 2, n = 1) | $T_h$ = 247° C. |
| when X = $CaCl_2$ (m = 1, n = 1) | $T_h$ = 265° C. |
| when X = $NiCl_2$ (m = 2, n = 4) | $T_h$ = 282° C. |

If the intention is to produce cold down to +10° C. in the enclosure to be refrigerated, the maximum temperature outside the latter being not more than +80° C., the distance of the point Q (FIG. 2) relative to the equilibrium straight line J being 20° C. and the condensation temperature being 85° C., using the same solid-gas reactions, the temperature $T_h$ of the source S will have to be higher than a value such that:

| | |
|---|---|
| when X = ZnCl$_2$ (m = 2, n = 2) | $T_h$ = 162° C. |
| when X = CuSO$_4$ (m = 4, n = 1) | $T_h$ = 170° C. |
| when X = CuSO$_{CuCl}$ (m = 1, n = 0.5) | $T_h$ = 180° C. |
| when X = LiBr (m = 2, n = 1) | $T_h$ = 196° C. |
| when X = ZnSO$_4$ (m = 3, n = 1) | $T_h$ = 200° C. |
| when X = LiCl (m = 1, n = 1) | $T_h$ = 208° C. |
| when X = MnCl$_2$ (m = 2, n = 4) | $T_h$ = 212° C. |
| when X = SrCl$_2$ (m = 0, n = 1) | $T_h$ = 217° C. |
| when X = LiCl (m = 0, n = 1) | $T_h$ = 249° C. |
| when X = FeCl$_2$ (m = 2, n = 4) | $T_h$ = 256° C. |
| when X = MgCl$_2$ (m = 4, n = 2) | $T_h$ = 256° C. |
| when X = CuSo$_4$ (m = 2, n = 2) | $T_h$ = 265° C. |
| when X = ZnSO$_4$ (m = 2, n = 1) | $T_h$ = 282° C. |
| when X = CaCl$_2$ (m = 1, n = 1) | $T_h$ = 311° C. |
| when X = NiCl$_2$ (m = 2, n = 4) | $T_h$ = 338° C. |

It is therefore possible, using the same single reaction chosen from the above reactions and employing a heat source S whose temperature is at the appropriate value, to produce cold continuously at a temperature of between +10° C. and −40° C.

The devices with two or three reactors which have just been described may be converted into devices permitting a continuous production of heat, by replacing the evaporator E and the condenser C with two reactors, each of these reactors containing the same solid capable of reacting with the gas, so as to produce successively in these two pairs of reactors the reactions mentioned in paragraph B of the introduction to the present description.

Naturally, the invention is not limited to the examples of embodiment which have just been described and many modifications can be made to these without departing from the scope of the invention.

Thus, the heat source S employed for heating the reactors R, R1, R2, R3 may be any source of heat of thermal or electric origin which is available. In particular, this source of heat may consist of waste heat.

The fluid F4 may be any heat transfer fluid other than oil.

Furthermore, the fluids F1, F2 and F3 may be other than air.

Naturally, the process and the device in accordance with the invention may be applied to the air conditioning of buildings, in particular of dwellings.

Figure 17A:
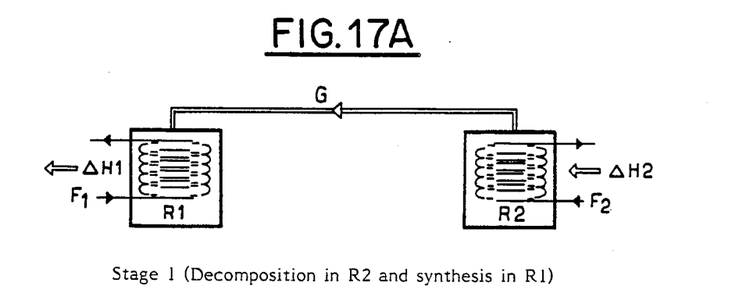
Figure 17B:
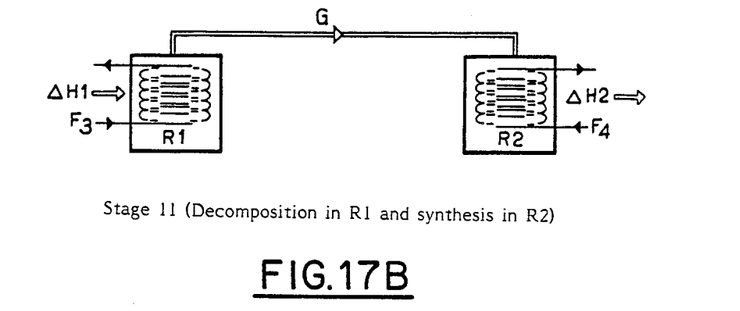

In the embodiment of FIG. 17, the device produces heat. It comprises two pairs of reactors $R_1$, $R_2$ identical with those described previously and each containing a solid compound capable of reacting with the gas G. Circuits are provided between the various reactors and means are provided for successively starting the solidgas reactions in the reactors and for producing the openings and the closings of the various communication circuits in a predetermined order to obtain a continuous heat production.

This device is closely related to the preceding one but instead of the condensation and the evaporation of the gas G being performed, the latter is reacted with a second solid $S_2$.

The following reactions are thus carried out successively (see FIG. 17):

Stage I:

Stage II:

As before, the operation of the device can be represented on a pressure/temperature diagram (see FIG. 2A).

In this figure:

(I) is the equilibrium straight line $<S1>+(G) \rightharpoonup <S1,G>$ (J) is the equilibrium straight line $<S2>+(G) \rightharpoonup <S2,G>$ The fluid G is always in the gaseous state and circulates alternately between two reactors, R1 and R2 one of which contains the solid $<S1>$ (or $<S1,G>$) and the other solid $<S2>$ (or $<S2,G>$).

When this device is employed as a heat pump, the energy balance is established as follows:

contribution of $\Delta H2$ to TD2 use of $\Delta H1$ at T1S and of $\Delta H2$ at T2S

"pumping" of $\Delta H1$ (gratis energy) at TD1.

As in the preceding embodiment, the various operating cycles may be started by means of solenoid valves, nonreturn valves and the like.

We claim:

1. device for producing cold, comprising two reactors (R1, R2) which contain a solid compound capable of reacting with a gas according to an exothermic reaction, these reactors being connected to a condenser (C), a gas collector (Co) and an evaporator (E), the inside of the reactors being in a heat exchange relationship with a heat source (S), n:eans being provided for successively starting the solid-gas reactions in the two reactors and for producing the openings and closings of various communication circuits between the reactors, the condenser, the collector and the condenser, in a predetermined order to obtain a continuous production of cold, which comprises means for starting the defrosting, these means being adapted for producing the following operations:

closing of the circuit between the two reactors (R1) and (R2), opening of the circuit between the evaporator (E) and the condenser (C) and opening of the circuit between the evaporator (E) and the gas collector (Co).

2. A device for producing heat, comprising two pairs of reactors, each containing a solid compound capable of reacting with a gas according to an exothermic reaction, these reactors being connected to a condenser (C), a gas collector (Co) and an evaporator (E), the inside of the reactors being in a heat exchange relationship ship with a heat source (S), communication circuits between the various reactors, the condenser, the collector and the evaporator, and means for successively starting the solid-gas gas reactions in the reactors, and for producing the openings and closings of various communication circuits in a predetermined order to obtain a continuous production of heat, which device comprises means for starting defrosting, these means being adapted for producing the following operations:

closing of the circuit between the two reactors (R1) and (R2), opening of the circuit between the evaporator (E) and the condenser (C) and opening of the circuit between the evaporator (E) and the gas collector (Co).

3. The device as claimed in claim 1, which comprises means for producing the following successive steps:
  (A) opening of the circuit between one (R1) of the reactors and the evaporator (E) and between the latter and the gas collector (Co),
  (B) opening of the circuit between the evaporator (E) and the reactor (R1) as soon as the gas pressure in the evaporator (E) is higher than that in the reactor (R1),
  (C) opening of the circuit between the other reactor (R2) and the evaporator (E) and between the latter and the gas collector (Co),
  (D) opening of the circuit between the evaporator (E) and the reactor (R2) as soon as the gas pressure in the evaporator (E) is higher than that in the reactor (R2),
  (E) opening of the circuit between the reactor (R1) and the external heat source (S) for heating the solid contained in this reactor,
  (F) opening of the circuit between the reactor (R1) and the condenser (C) as soon as the pressure in the reactor is higher than that in the condenser,
  (G) closing of the circuit between the reactor (R1) and the heat source (S) and opening of the circuit between the reactor (R2) and the heat source (S),
  (H) closing, under the effect of the pressure prevailing in the reactor (R2), of the circuit included between the latter and the evaporator (E) and opening of the circuit between the reactor (R2) and the condenser (C),
  (I) closing, after a pressure drop in the reactor (R1), of the circuit between the latter and the condenser (C) and opening of the circuit between this reactor (R1) and the evaporator (E).

4. The device as claimed in either of claim 1, which comprises means for producing, after the defrosting, the following operations:
  closing of the circuits between the evaporator (E) and the condenser (C) and between the evaporator (E) and the gas collector (Co).

5. The device as claimed in claim 1, wherein the said means comprise electromagnetic control valves and nonreturn valves.

6. The device as claimed in claim 1, wherein the said means comprise a controlled pressure valve (VPC) in the circuit connecting the two reactors (R1, R2) to the evaporator (E) for controlling the pressure and the temperature of gas evaporation.

7. The device as claimed in claim 1, wherein the said means comprise a thermostatic expansion valve (DT) in the circuit connecting the evaporator (E) to the collector (Co) for preventing the fluid condensed in the condenser (C) from circulating beyond the evaporator (E) in the liquid state.

8. The device as claimed in claim 1, which comprises a third reactor (R3) containing the said solid compound capable of reacting with the gas, and connected to the external heat source (S), the condenser (C), the collector (Co) and the evaporator (E), means being provided for successively starting the solid-gas reactions in the three reactors (R1, R2, R3, R4) so that the third reactor (R3) can store energy without any energy input other than that needed for the circulation of the heat transfer fluid (F4).

9. The device as claimed in claim 8, wherein the said means are adapted to permit the following successive operating steps:
  (A) opening of the circuit between the first reactor (R1) and the evaporator (E) and between the latter and the collector (Co),
  (B) opening of the circuit between this reactor (R1) and the condenser (C), between the second reactor (R2) and the evaporator (E) and between the collector (Co) and the condenser (C),
  (C) opening of the circuit between the first reactor (R1) and the evaporator (E), between the second reactor (R2) and the condenser (C) and between the latter and the collector (Co), circuit between the third reactor
  (C) opening of the circuit between the third reactor (R3) and the evaporator (E) and between the latter and the collector (Co).

10. The device as claim in claim 1, wherein the heat transfer fluid (F4) circulating between the reactors and the external heat source is oil.

11. The device as claimed in claim 1, wherein the means for removing the heat released during the solid-gas reaction and for removing the heat of condensation comprise means of heat exchange with the surrounding air.

12. The device as claimed in claim 1, wherein the external heat source consists of waste heat.

* * * * *